United States Patent [19]
Vermilion et al.

[11] Patent Number: 5,985,200
[45] Date of Patent: Nov. 16, 1999

[54] INJECTION MOLDING OF ASPHALT-BASED COMPOSITIONS

[75] Inventors: Donn R. Vermilion, Newark, Ohio; Jorge A. Marzari, Bolingbrook, Ill.; Frederick H. Ponn, Newark, Ohio; Doug Kuhlmann, Kent, Wash.

[73] Assignee: Owens Corning Fiberglass Technology, Inc., Summit, Ill.

[21] Appl. No.: 08/989,449

[22] Filed: Dec. 12, 1997

[51] Int. Cl.[6] .................................................. B29C 45/47
[52] U.S. Cl. ................................... 264/328.17; 366/76.6; 425/207; 425/587
[58] Field of Search ........................... 264/328.17, 328.1, 264/328.18, 349; 425/207, 208, 209, 585, 586, 587; 424/59, 62, 63, 64; 366/76.6

[56] References Cited

U.S. PATENT DOCUMENTS

| | | |
|---|---|---|
| 3,980,598 | 9/1976 | Moorwessel et al. . |
| 4,025,274 | 5/1977 | Uemura et al. .......................... 264/349 |
| 4,877,568 | 10/1989 | Austin ...................... 425/207 |
| 5,399,598 | 3/1995 | Peters .................... 264/211.23 |
| 5,567,364 | 10/1996 | Philipps ................. 264/328.1 |
| 5,733,616 | 3/1998 | Janicki et al. . |

*Primary Examiner*—Jill L. Heitbrink
*Attorney, Agent, or Firm*—Inger H. Eckert; James J. Dottavio

[57] ABSTRACT

An injection molding process and apparatus to manufacture asphalt-based products which utilizes a heated mixing chamber to continuously blend molten thermoplastic polymer and asphalt to form an injection moldable composition.

19 Claims, 6 Drawing Sheets

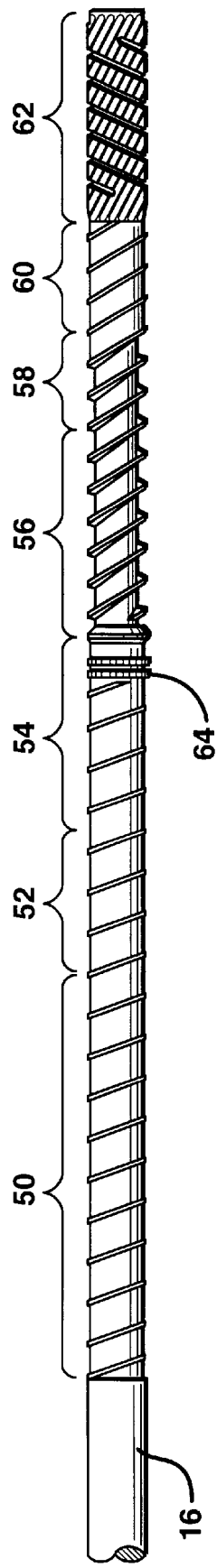
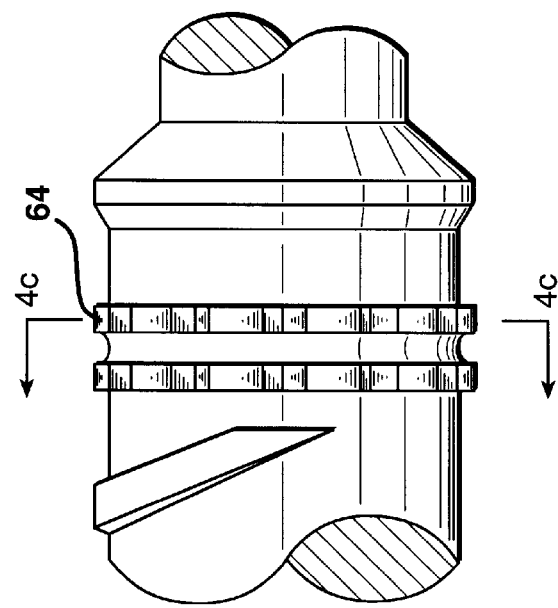
FIG. 4(a)
FIG. 4(b)

INJECTION MOLDING OF ASPHALT-BASED COMPOSITIONS

TECHNICAL FIELD AND INDUSTRIAL APPLICABILITY OF THE INVENTION

This invention relates to an injection molding process and an apparatus to carry out the process. In particular, the invention relates to a process and apparatus for molding mixtures of asphalt and polymeric materials, wherein the various materials to be molded are mixed or blended together in the apparatus immediately prior to molding. The process and apparatus of the invention may be used to form asphalt-based products from asphalt compositions containing thermoplastic polymers that increase the strength and toughness of the resulting products. In particular, the invention relates to a process and apparatus that is able to control the concentration of asphalt and polymers blended, while providing good mixing of the materials.

BACKGROUND OF THE INVENTION

Thermoplastic injection molding (TIM) is a well known and widely used technique to manufacture a large variety of plastic or polymeric products. In general, TIM involves forcing molten thermoplastic materials into a mold wherein, upon cooling, they form a solid polymeric article in the shape defined by the mold. In such processes, the thermoplastic material is typically melted in a heated chamber or barrel of an injection molding machine, whereupon it is injected into the mold. While TIM has enjoyed wide use in the manufacture of plastic articles, it has rarely been used in the manufacture of asphalt-based products.

With the recent development of asphalt-based compositions suitable for the manufacture of shaped articles, a need has arisen for molding processes and equipment capable of mass producing such articles economically and efficiently. Although these asphalt-based compositions can be formed into articles by molding techniques such as vacuum molding or compression molding, a suitable injection molding process would, in most high volume circumstances, be preferable because of its high speed and low cost in making products and its wide acceptance and usage in the parts manufacturing industry. One of the main virtues of an asphalt-based composition is its low material cost. However, compounding asphalt with thermoplastics negates a large part of that cost advantage. Accordingly, a need exists for an injection molding process and apparatus suitable for the injection molding of compositions containing asphalt and thermoplastic polymers that mix the thermoplastic polymers and asphalt directly in the injection molding machine. These needs are met by the injection molding process and apparatus described herein.

SUMMARY OF THE INVENTION

The present invention provides a process and apparatus for injection molding asphalt-based compositions without the need for separately "compounding" the thermoplastic polymer and asphalt components of such compositions together prior to the molding process. As used herein, the singular terms "asphalt" and "thermoplastic polymer" are intended to encompass the plural and should be interpreted as "one or more asphalts" and "one or more thermoplastic polymers", respectively.

In the process of the invention, the asphalt and thermoplastic polymer components of the composition are supplied directly to the barrel or mixing chamber of an injection molding machine where they are blended with each other, and brought to, or maintained at, a temperature and viscosity suitable for molding. Depending on the melting point and thermal viscosity profile of the specific asphalt and polymer used in the composition, the components may be added to the mixing chamber as a solid or melt, and at the same or different locations, as may be necessary to ensure that they combine into a substantially homogeneous mixture having a viscosity suitable for injection molding.

The process of this invention thus accommodates diversity in melting point and viscosity for the polymeric materials and the asphalt. If the specific asphalt and polymer selected for the composition have similar melting points, and will form melts having suitable viscosities for homogeneous mixing and molding when heated to a common temperature, then the asphalt and polymer can be added to the mixing chamber at the same location either in solid or molten form, independently or as a pre-blended mixture. However, if either component has a melting point significantly above that of the other, the higher melting point material typically should be brought to its melting temperature prior to mixing with the lower melting point material. In addition, high molecular weight polymers typically require mechanical work in addition to temperature to bring them to a fluid state suitable for compounding and molding. Molten asphalt which is very low in viscosity relative to high molecular weight polymers actually acts as a lubricant preventing the machine from imparting the necessary work into the polymer, thus a well mixed compound suitable for molding is difficult to obtain.

The invention thus provides for inputting the polymeric material into the injection molding machine separately from the asphalt so that the higher melting point and higher viscosity material, typically the polymer, can be brought to a molten state through mechanical work and heating to its melting temperature without raising the asphalt temperature above its preferred viscosity level. Once melted, the polymeric material is then combined and blended with the asphalt for a time sufficient to ensure that the asphalt is molten and that the molten polymer is dispersed substantially homogeneously throughout the asphalt prior to injection of the composition into the mold.

To permit the melting, mixing and molding of materials having significantly different melting points and viscosities, the apparatus of the invention provides a variety of mixing chamber configurations for the injection molding machine to allow the polymeric and asphalt components to be input at different locations along its length. As such, the component of the composition having the highest melting point and viscosity can be input into the mixing chamber at the input port located furthest from the injection nozzle, and the components having lower melting points and lower viscosity can be added to the mixing chamber at input ports located downstream. Since the polymeric material will typically have the higher melting point and viscosity, the polymer will usually be added to the chamber at a first input, where work and heat are added to bring the material to a molten state, and then combined with solid or molten asphalt, input at a second site downstream from the first input.

The mixing chamber of the invention includes a mixing screw which rotates to blend and move the materials along its length, and reciprocates to inject the material into the mold. The screw has a helical groove or flighting formed along its axis, in the usual manner, to move the materials, and may have additional mixing elements superimposed thereon over a portion of its length to assure thorough mixing and blending of the materials within the chamber.

Depending on the location of the input ports for the various components, and the relative amounts of the components in the formulation, the depth, spacing and orientation of the helical groove may vary along the length of the mixing screw to create zones of varying capacity and pressure to accommodate input, melting, metering and blending of the component materials to form the moldable composition. Heating within the chamber to melt the materials, and/or maintain them in a molten state, is caused both by friction between the materials and the mixing screw, and by a heater around the outside of the mixing chamber.

BRIEF DESCRIPTION OF THE DRAWINGS

FIGS. 4(a), 4(b), 4(c) and 4(d), respectively, are cross-sections of a mixing screw useful in the apparatus depicted in FIG. 3.

DETAILED DESCRIPTION AND PREFERRED EMBODIMENTS OF THE INVENTION

Figure 1A:
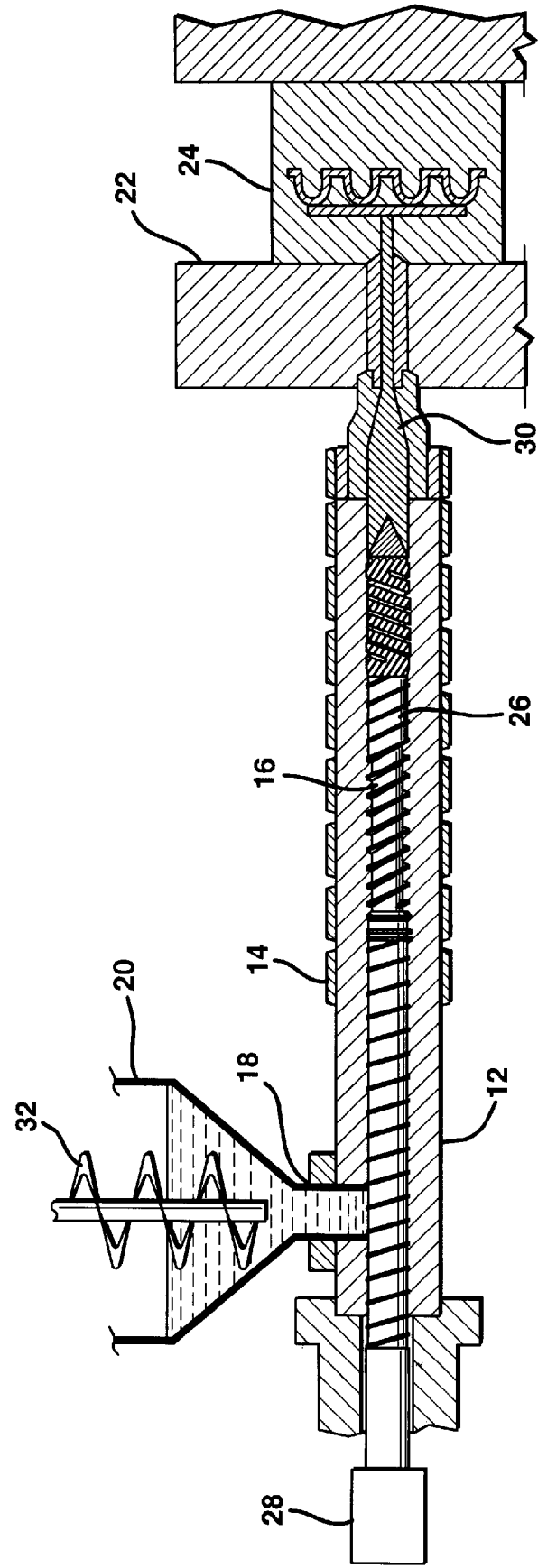
FIGS. 1(a) and 1(b) are cross-sections of an injection molding apparatus useful in carrying out the process of the invention using solid polymer and asphalt.

The present invention provides an injection molding process and apparatus especially adapted for the production of shaped articles from asphalt-based compositions. Such compositions include those containing asphalt in the range of from about 0.1% to 1.0% by weight as a colorant in molded thermoplastics, up to asphalt loadings of about 95%. However, the invention is particularly well suited for molding articles from compositions comprising from about 40 to 90 weight percent asphalt, and from about 10 to 60 weight percent thermoplastic polymer. The term "asphalt" as used herein includes asphalt bottoms from petroleum refineries, as well as naturally occurring asphalts, tars and pitches, or these same materials that have otherwise been air-blown or chemically modified. At asphalt loadings of from about 70% to 95% the asphalt is preferably highly blown or otherwise modified to improve its moldability.

The polymeric component is generally selected to add strength and resiliency to the composition, and typically comprises one or more thermoplastic materials such as polyethylene, polypropylene, ethylene-propylene copolymers, ethylenevinylacetate, ethylenemethylacrylate, and synthetic rubbers such as random copoymers of styrene-butadiene, and block copolymers of styrene-butadiene-styrene, styrene-ethylene-butylene-styrene and styrene-isoprene-styrene. Mixtures of polypropylene and ethylenevinylacetate being particularly useful in some applications.

For articles intended for use in connection with roofing applications wherein solubility in trichlorethylene pursuant to ASTM D312 is preferred, polypropylene that has been modified or "grafted" with a polar monomer such as maleic anhydride, acrylic or methacrylic acid, or an ester thereof is generally preferred. The polar monomer is preferably present at a level of from about 0.1% to about 10% by weight, more preferably, from about 0.3% to about 1.0%. Unlike other trichloroethylene soluble polymers such as ethylenevinylacetate, such modified polypropylene is still highly crystalline and will retain its strength at the pouring temperatures of typical roofing asphalts. When used in the process of the invention, such modified polypropylene polymers may be added directly to the injection molding apparatus, or unmodified polypropylene and polar monomer may be added to the mixing chamber of the injection molding apparatus and the modified polypropylene formed therein. Usually, the temperature in the mixing chamber will be sufficient to cause the desired modification of the polypropylene, however, peroxides may be added if necessary.

It is important that the polymer and the asphalt have the ability or tendency to blend uniformly with one another. Thus, the polymer selected preferably has solubility parameters similar to the components of the asphalt. Additionally, the melting point of the particular polymer should be compatible with the melting point of the particular asphalt being used. Accordingly, it is typically preferred that the asphalt have a melting temperature above 200° F. (93.3° C.), more preferably above 250° F. (121° C.), and even more preferably above 300° F. (148.9° C.).

Additionally, depending on the intended use of the resulting product, the asphalt based composition may also contain other materials such as fillers, mold release agents and other adjuvants typically encountered in the art of molding thermoplastic materials.

In the process and apparatus of the invention, the asphalt-based composition is formulated in the mixing chamber of an injection molding machine. The mixing chamber generally comprises a hollow bore having a rotating and reciprocating mixing screw positioned therein. The thermoplastic polymer components and the asphalt are added to the mixing chamber, either as a mixture or separately, where they are heated and blended together to form a substantially homogeneous molten mixture as they are moved through the mixing chamber by the rotating screw. The asphalt and polymer may be added to the mixing chamber in solid or molten form, as the mixing chamber is heated to melt the materials or maintain them in a molten state as necessary. Once the materials are thoroughly mixed and form a substantially homogeneous melt, the melt is injected into a mold through an injection nozzle by the reciprocative movement of the mixing screw and allowed to cool and solidify.

Depending on the respective melting point and viscosity characteristics of the components, they may be added to the mixing chamber at the same or different inlets. For example, if the asphalt and polymeric components melt at about the same temperature and have viscosities suitable for mixing and molding at a common temperature, both components may be added to the mixing chamber through the same inlet. However, if the asphalt and polymeric materials do not have similar melting points or do not have suitable viscosities for proper mixing at a common temperature, the components are preferably added to the mixing chamber at different locations. In particular, the component with the lower melting point is preferably added to the mixing chamber at a location downstream from that of the higher melting component so the machine has time to masticate and heat the high melting component into a molten state which will exhibit good mixing and molding characteristics. Since the thermoplastic polymers typically have higher melting points and viscosities than the asphalt materials, the polymers are usually added to the mixing chamber at an inlet located furthest from the injection nozzle, and the lower melting point asphalt is added thereto at a point downstream.

Although the thermoplastic polymer can be heated to form a melt prior to its introduction into the mixing chamber, it is generally preferred that the polymer be added to the mixing chamber in solid form, such as flakes or pellets, and heated to its melting temperature within the mixing chamber. To this end, at least a portion of the mixing chamber is preferably heated to a temperature above the melting point of the polymer. Moreover, heat generated by friction as the polymer particles are pushed through the chamber by the rotating mixing screw aids in the melting process. Thus, by regulating the residence time of the polymer within the heated portion of the mixing chamber, and the temperature of the mixing chamber, the polymer is transformed into a melt having a desired viscosity as it moves through the mixing chamber.

When the polymer component consists of two or more polymeric materials having similar melting points, the polymeric materials may be combined prior to their introduction into the mixing chamber. However, if the polymers have significantly different melting points and viscosities, the lower melting point polymer should be added to the mixing chamber downstream of the higher melting polymer to prevent the viscosity of the lower melting polymer from becoming too low to mix and mold properly.

To ensure good mixing of the asphalt and polymer, asphalt having a lower melting temperature than that of the polymer should be added to the polymer in the mixing chamber at a downstream location that will allow it sufficient residence time within the mixing chamber to mix thoroughly with the polymer prior to injection of the composition into the mold. As such, if the asphalt is added to the mixing chamber as a solid, greater residence time will be necessary to render the asphalt suitably viscous than if the asphalt is introduced in molten form. While both solid and molten asphalt may be used in the present invention, molten asphalt is somewhat easier to handle and is generally preferred. Accordingly, it is preferred that the asphalt be heated to form a melt prior to being introduced into the mixing chamber, and that the molten asphalt be added to the mixing chamber at a location where its residence time within the mixing chamber and contact time the polymer will be sufficient for the asphalt to be thoroughly mixed with the polymer. Moreover, in order to ensure that the molten asphalt does not coat the surface of the solid polymer and interfere with its melting, it is preferred that the molten asphalt be added to the mixing chamber at a location downstream from the polymer melting section of the mixing chamber.

Figure 1B:
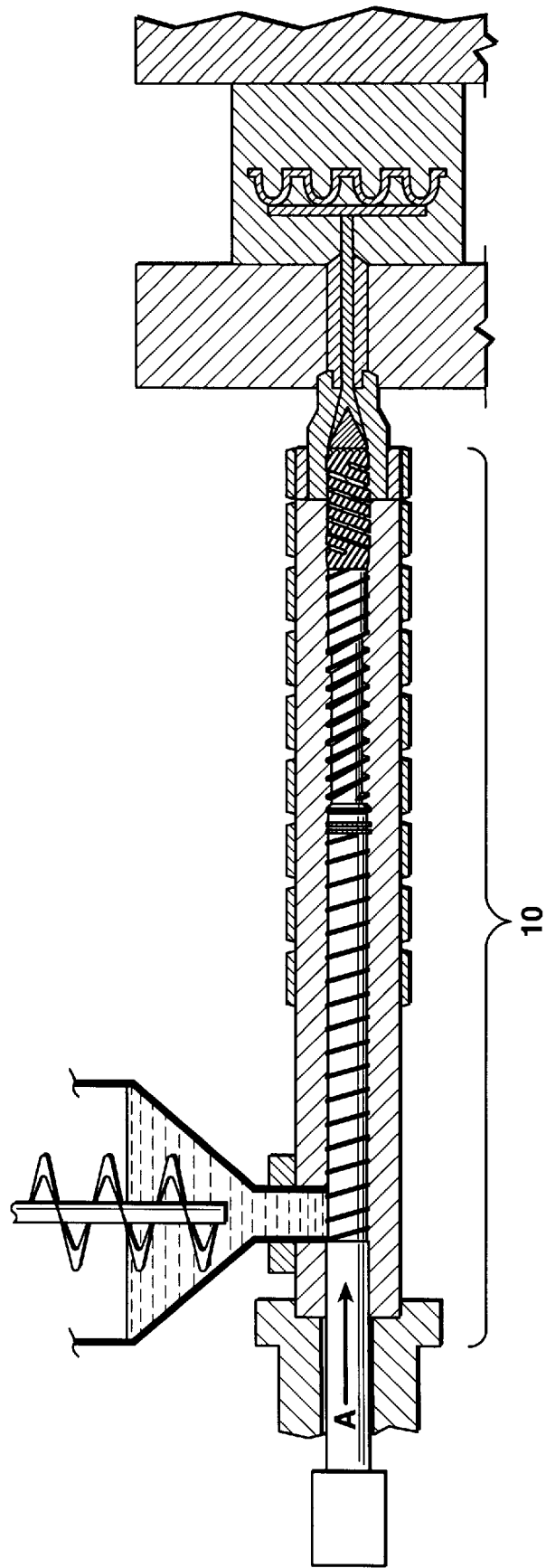

Apparatuses useful for performing the injection molding processes described above are shown in FIGS. 1 through 3. Specifically, FIG. 1 illustrates an apparatus particularly useful for molding a composition comprising a mixture of solid asphalt and polymer having similar melting points and viscosities. FIG. 1(a) shows the mixing screw in its retracted mixing position, and FIG. 1(b) shows the mixing screw in its forward injecting position. As shown, the injection molding apparatus includes a mixing chamber 10 formed of an elongated cylindrical bore 12, heated along at least a portion of its length by heating means 14, and a mixing screw 16 disposed therein. Near one end of the mixing chamber, an inlet port 18 is provided for permitting the introduction of asphalt and polymer into the cylindrical bore. A bulk storage container or hopper 20 is preferably connected to inlet port 18 to ensure that a continuous supply of asphalt and polymer is provided to the mixing chamber. At the opposite end, the mixing chamber is attached to molding block 22 such that the cylindrical bore is in flow communication with mold 24 through injection nozzle 26.

The mixing screw 16 has helical grooves 27 formed therein and is attached at its end opposite the injection nozzle to a reciprocating and rotating drive means 28. Rotation of the mixing screw moves the asphalt and polymer introduced through the inlet port longitudinally through bore 12 toward injection nozzle 26 and mixes the two components together. When a sufficient quantity of the mixture accumulates in the injection chamber 30, at the end of the mixing screw adjacent injection nozzle 26, the mixing screw 16 reciprocates as shown by arrow A to push or inject the asphalt-based material along the chamber axis through injection nozzle 26 and into the mold 24.

In operation, a mixture of ground asphalt and thermoplastic polymer, in pellet or flake form, can be stored in hopper 20 and added to mixing chamber 10 through inlet port 18. To ensure a positive input of the solid materials, a feeder 32 may be used to literally force the mixture into mixing chamber 10. Inside the mixing chamber, rotation of mixing screw 16 carries the materials along the longitudinal heated bore while they are being melted. When a sufficient quantity of the molten mixture has accumulated in the injection chamber at the end of the mixing screw, the screw reciprocates forcing the molten mixture through the injection nozzle and into the mold.

Figure 2:
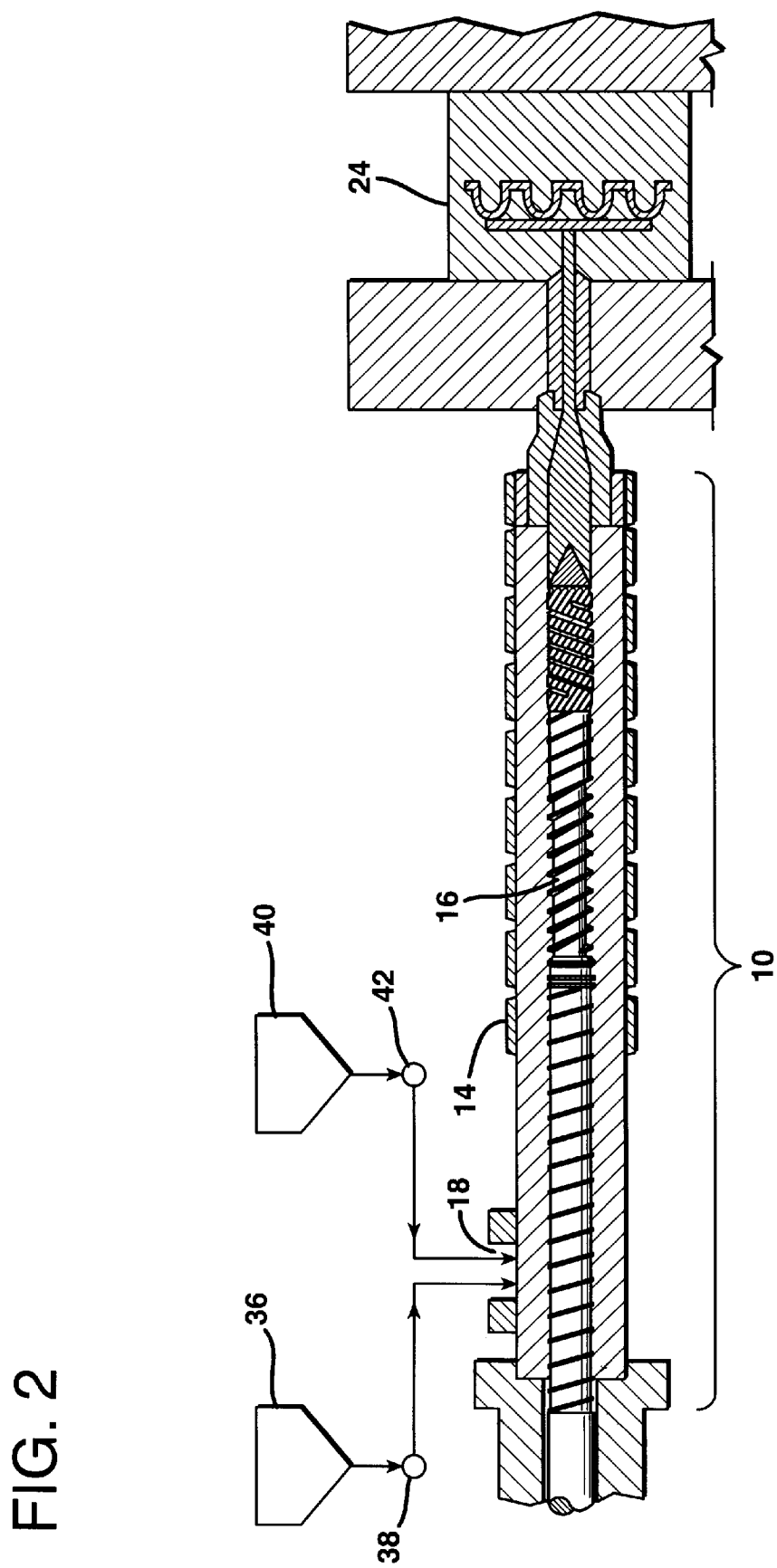
FIG. 2 is a cross-section of an alternative embodiment of an injection molding apparatus useful in performing the process of the invention using molten polymer and asphalt.

An alternative embodiment that is particularly useful for mixing and molding molten component streams is shown in FIG. 2. In this embodiment, molten polymer and molten asphalt are stored in tanks 36 and 40, respectively. Using pumps 38 and 42, the polymers and asphalt are added to mixing chamber 10 through inlet port 18. The materials are mixed and blended as they are carried through chamber 10 by rotation of the mixing screw 16 as in the embodiment discussed above. In this instance, heater 14 is used to maintain mixing chamber 10, and the contents thereof, at a temperature that ensures a proper viscosity of the mixture as it moves through mixing chamber 10 and is injected into the mold 24 by reciprocation of screw 16.

Figure 3:
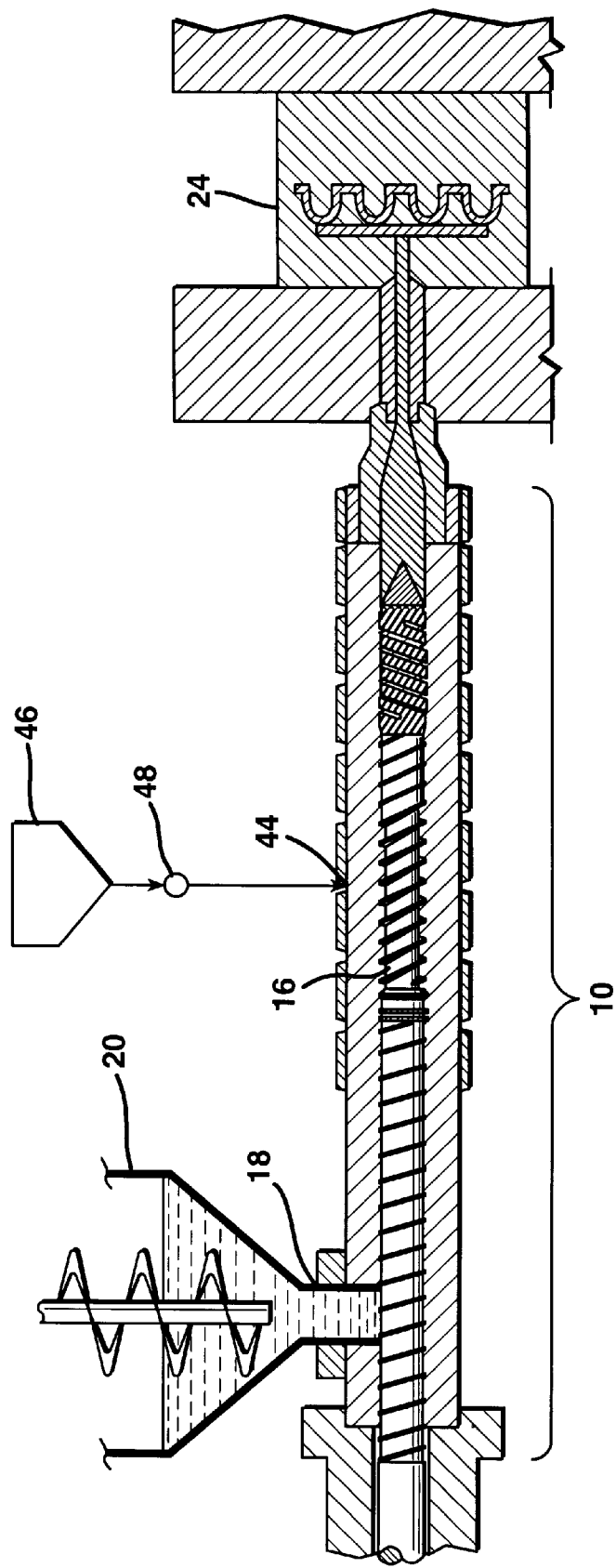
FIG. 3 is a cross-section of an injection molding apparatus of the invention useful for performing the process of the invention with solid polymer and molten or solid asphalt feeds.

An additional embodiment of the invention provides an injection molding machine that is particularly well-suited for combining and molding inputs of polymer and asphalt where the melting point of the asphalt is lower than that of the polymer. This embodiment is shown in FIG. 3. In this embodiment, thermoplastic polymer, preferably in solid or flake form, may be stored in hopper 20 and added to the mixing chamber 10 through inlet port 18. The asphalt is added to the mixing chamber downstream through a second inlet 44. In this instance, the asphalt may be molten asphalt which is heated to a suitable temperature in tank 46, and added to the mixing chamber 10 through inlet 44 via pump 48. Alternatively, the asphalt may be added as a solid through inlet 44. Within the mixing chamber, the polymer added from hopper 20 is heated to form a melt as it is carried along by screw 16, and is then mixed with the asphalt added through inlet 44 to form the moldable composition.

The inlet 44 for the asphalt is preferably located downstream of the polymer inlet 18 at a spacing sufficient to ensure that the asphalt is added after the polymer has thoroughly melted in the melting section of the mixing chamber. The melting section is that portion of the mixing chamber wherein the polymer materials added as pellets or flakes are completely melted and blended with each other prior to introduction of the molten asphalt.

The temperature of the melting section is preferably set, depending on the thermoplastic polymer being used, at a level sufficient to melt the polymer prior to the introduction of the asphalt. Typical temperatures range from about 325° F. (162.8° C.) to about 500° F. (260° C.), with about 460° F. (237.8° C.) being generally preferred for mixtures of polypropylene and ethylenevinylacetate. The temperature of the bore generally decreases downstream from the polymer melting section; however, the bore temperature should be kept at a level that the materials will mix and mold well. Generally, this is accomplished by maintaining the mixture at a temperature of from about 350° F. (176.7° C.) to about 375° F. (190.6° C.). At higher temperatures, the components often do not mix well, and the mixture may flow too freely and flash when molded. Likewise, the temperature of molten asphalt introduced into the mixing chamber should be sufficient to render it pumpable, but insufficient to adversely affect mixing. For example, an AC20 asphalt blown to a melting point of 250° F. (121.1° C.) is preferably introduced at around 360° F. (182.2° C.). Although such an asphalt can be heated to more than 450° F. (232.2° C.) without adversely affecting its chemical composition, at such temperatures its viscosity is too low to mix as well.

Figure 4C:
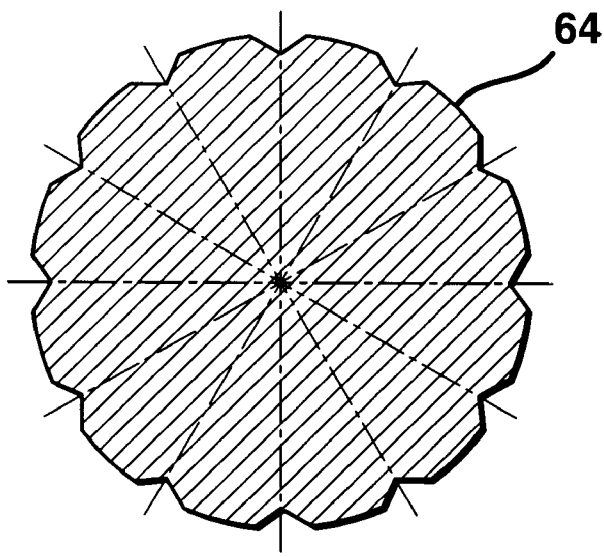
Figure 4D:
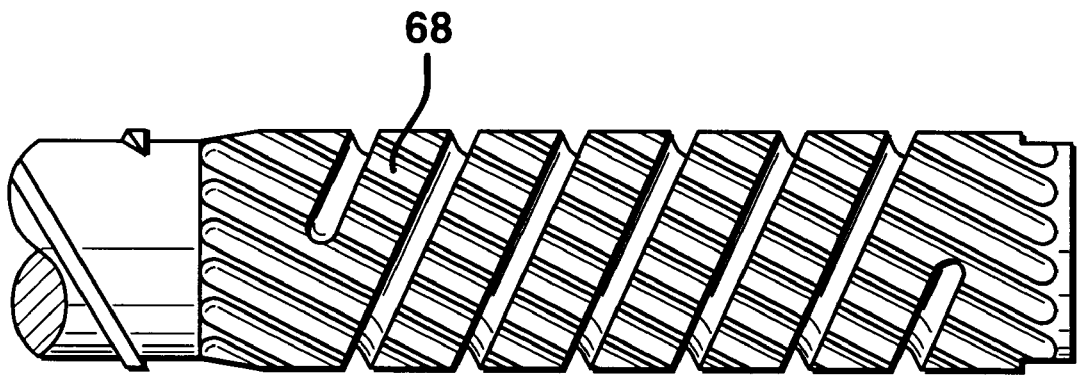

In order to accommodate the introduction of the asphalt in the mixing chamber at a location downstream from the polymer inlet, and regulate the amount of the various components in the mixture, the mixing screw generally should have variations in the depth and spacing of the flighting or helical grooves formed along its length. Although many mixing screw designs that will accomplish the requisite mixing and metering of the components are within the purview of those skilled in the art, a particularly useful mixing screw was obtained from XALOY, Inc. of Newburyport, Mass. and is illustrated in FIG. 4. This mixing screw is formed of seven zones containing different patterns of helically cut grooves, including a polymer feed zone 50, a first transition zone 52, a polymer metering zone 54, an asphalt feed zone 56, a second transition zone 58, an increased pressure shear zone 60, and a homogenizing zone 62.

As shown in FIG. 4(*a*), the mixing screw 16 preferably has relatively deep flighting grooves in the polymer feed zone 50 adjacent the polymer feed port of the mixing chamber to ensure that a sufficient quantity of solid polymer is taken up. As the solid polymer particles or flakes begin to melt in this zone, the accompanying volume decrease results in the thread groves becoming incompletely filled with polymer in varying degrees. Thus, to ensure a relatively constant amount of molten polymer in the resulting mixture, the mixing screw is preferably provided with polymer metering zone 54 downstream of the polymer feed zone. In this zone, the depth of the grooves are lessened to regulate the amount of the molten polymer carried forward to ensure that the desired amount is maintained. A first transition zone 52, wherein the depth of the grooves becomes progressively reduced, is preferably positioned between the polymer feed and metering zones to prevent excessive pressure build-up and flow impedance.

Downstream of polymer metering zone 54, and adjacent the asphalt inlet, the flighting grooves of the asphalt feed zone 56 are deepened to reduce the pressure and allow for the introduction of the molten asphalt. Here again, to ensure that a sufficient quantity of asphalt is taken up, the grooves are preferably deeper. Between the polymer metering zone 54 and the asphalt feed zone 56, flanges 64 (shown in enlargements 4(*b*) and 4(*c*)), function to help meter material into the low pressure zone where the low melting material (e.g., asphalt) is added.

The amount of asphalt added to the mixing chamber is preferably controlled by an external metering device. The device may consist of a plunger system controlled by microswitches and powered by compressed air. During the screw injection stroke valves are automatically switched to open the asphalt inlet to fill the cylinder to a preset volume. During the screw recovery stroke, the valves are automatically switched to force, under pressure, the metered volume of asphalt into the injection molding machine. The composition of the finished part is controlled by metering a known weight of asphalt into the injection molding machine with each injection stroke which pushes a constant, known quantity of compound into the mold. The molten asphalt may be supplied to this plunger system from either asphalt melting equipment or from a reservoir. The asphalt is preferably continuously circulated in a recirculation loop, and only fills the cylinder-plunger system when the tuned microswitched valves are in the correct position.

As with the polymer metering zone, a second transition zone 58 having progressively shallower grooves is preferably positioned between the asphalt feed zone 56 and the increased pressure shear zone 60 to prevent flow impedance. Once the desired amounts of both components are contained within the grooves, they are preferably thoroughly blended to form a substantially homogeneous mixture in homogenizing zone 62. As shown in enlargement 4(*d*), the spacing of the grooves is reduced in this zone, and a pattern of spaced parallel channels 68 of shallower depth and opposite rotational orientation are superimposed thereon to promote cross-flow and mixing of the components.

Although the invention has been described in detail in reference to preferred embodiments, appropriate modifications will become apparent to the artisan. Thus, the invention is intended not to be limited by the foregoing description, but rather by the appended claims and their equivalents.

What is claimed is:

1. A process for molding an asphalt-based composition in an injection molding machine equipped with a mixing chamber comprising:
   (a) introducing at least one thermoplastic polymer into said mixing chamber;
   (b) introducing at least one asphalt into said mixing chamber; wherein the at least one thermoplastic polymer is introduced into the mixing chamber separately from the asphalt;
   (c) mixing said at least one thermoplastic polymer and said at least one asphalt in said mixing chamber to form a substantially homogeneous mixture comprising from about forty percent by weight to about ninety-five percent by weight asphalt; and
   (d) injecting said mixture into a mold.

2. The process of claim 1, wherein said polymer and said asphalt are introduced into said mixing chamber at a common location.

3. The process of claim 2, wherein said polymer and said asphalt are introduced as solids and heated in said mixing chamber to a temperature above their respective melting points.

4. The process of claim 1, wherein said asphalt and said polymer are introduced into said mixing chamber at different locations.

5. The process of claim 4, wherein said polymer is introduced as a solid and heated to a temperature above its melting point prior to the introduction of said asphalt.

6. The process of claim 5, wherein said asphalt is added as a liquid melt.

7. The process of claim 5, wherein said asphalt is added as a solid.

8. The process of claim 4, wherein the quantity of said polymer and said asphalt in the mixture is metered within said mixing chamber.

9. The process of claim 1, wherein said at least one polymer is selected from the group consisting of polyethylene, polypropylene, ethylene-propylene copolymers, ethylenevinylacetate, and ethylenemethylacrylate.

10. The process of claim 1, wherein said at least one polymer comprises polypropylene grafted with a polar monomer selected from the group consisting of maleic anydride, acrylic acid, methacrylic acid and esters thereof.

11. The process of claim 10, wherein said polypropylene and said polar monomer are independently introduced into said mixing chamber.

12. The process of claim 1, wherein said at least one polymer comprises a synthetic rubber.

13. The process of claim 12, wherein said at least one synthetic rubber is selected from the group consisting of styrene-butadiene, styrene-butadiene-styrene, styrene-ethylene-butylene-styrene and styrene-isoprene-styrene polymers.

14. An apparatus for injection molding an asphalt-based composition comprising:
   (a) a longitudinal solid body having a cylindrical hollow bore therein;
   (b) a mold connected to one end of said bore and in flow communication therewith;
   (c) means for introducing solid polymer into said bore at a first location;
   (d) means for melting said polymer in said bore;
   (e) means for transporting said molten polymer along said bore
   (f) means for introducing asphalt into said bore at a second location between said first location and said mold; and
   (g) means for mixing from about forty percent by weight to about ninety-five percent by weight of said asphalt with said polymer and injecting said mixture into said mold.

15. The apparatus of claim 14, wherein said means for transporting, mixing and for injecting comprises a mixing screw disposed within said bore having means thereon to mix said polymer and said asphalt and to move said mixture through said bore toward said mold when rotated, and means to rotate and reciprocate said mixing screw attached thereto.

16. The apparatus of claim 15, wherein said mixing screw comprises a generally cylindrical body having at least one helical groove formed therein along at least a portion of its length, said helical groove having a rotational orientation matched to the direction of the screw's rotation to move the material within the bore toward the mold.

17. The apparatus of claim 16, wherein said mixing screw includes a means for regulating the amount of polymer in the mixture.

18. The apparatus of claim 14, wherein said asphalt is introduced into said bore as a liquid melt.

19. The apparatus of claim 14, further comprising a means for heating said bore.

* * * * *